United States Patent [19]
Levin

[11] 4,011,431
[45] Mar. 8, 1977

[54] ELECTRIC COOKING APPLIANCE WITH REVERSIBLE GRILL

[76] Inventor: Monte L. Levin, 19 Sutton Place, New York, N.Y. 10022

[22] Filed: Apr. 5, 1976

[21] Appl. No.: 673,629

[52] U.S. Cl. ............................ 219/524; 99/340; 99/375; 99/376; 99/446; 219/386; 219/472; 425/408

[51] Int. Cl.² .................. H05B 1/00; A47J 37/00; B29C 3/00

[58] Field of Search ......... 219/524, 525, 521, 385, 219/386, 472–475; 99/340, 372–385, 422–426, 428, 439, 432, 445–449, 440–442; 100/93 R, 93 P; 425/408; D7/94, 95, 99, 88, 89, 87; 126/261

[56] References Cited
UNITED STATES PATENTS

| | | | |
|---|---|---|---|
| 1,493,444 | 5/1924 | Burch | 99/376 X |
| 1,587,788 | 6/1926 | Morley | 99/376 |
| 2,066,507 | 1/1937 | Yost | 219/524 UX |
| 2,198,647 | 4/1940 | Wolcott | 99/340 |
| 2,597,541 | 5/1952 | Squires | 99/377 |
| 3,348,470 | 10/1967 | Swanson | 219/524 X |
| 3,490,358 | 1/1970 | Bardeau et al. | 99/380 X |
| 3,963,898 | 6/1976 | Tuckwell | 219/524 |

*Primary Examiner*—A. Bartis

[57] ABSTRACT

Electric cooker has cover containing electric heating element and base pan interposed by an invertible grill. Grill is formed with mating zones, preferably grooves, about either side to cooperate with a depending rib from the cover. Opposite faces of the grill present respectively a circular dam for hamburgers or the like, and a rectangular dam for sandwiches. Irrespective of which face is up and serving as a cooking surface, cooperation of rib and associated mating zone provide good heat transfer to grill from cover.

7 Claims, 6 Drawing Figures

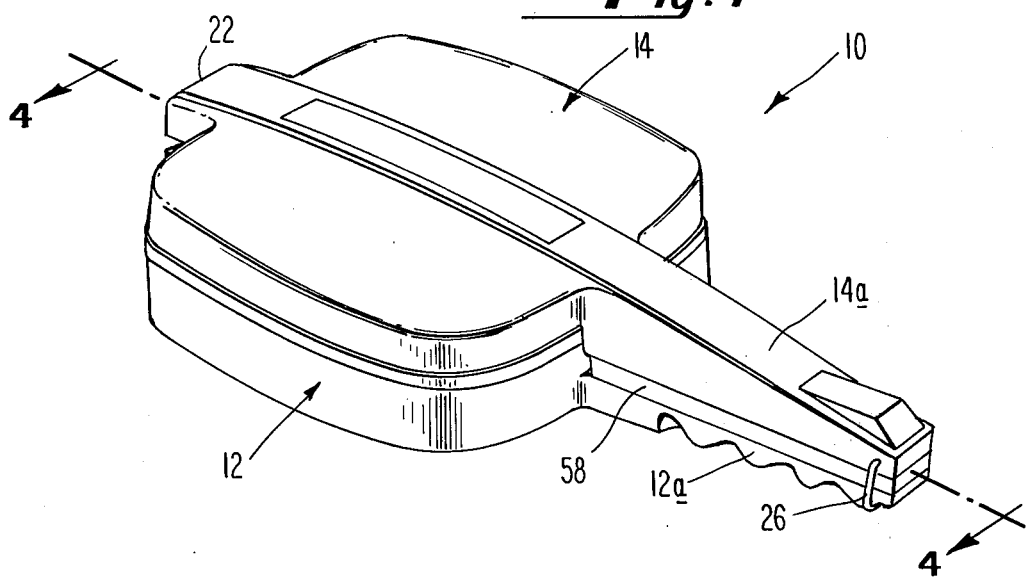
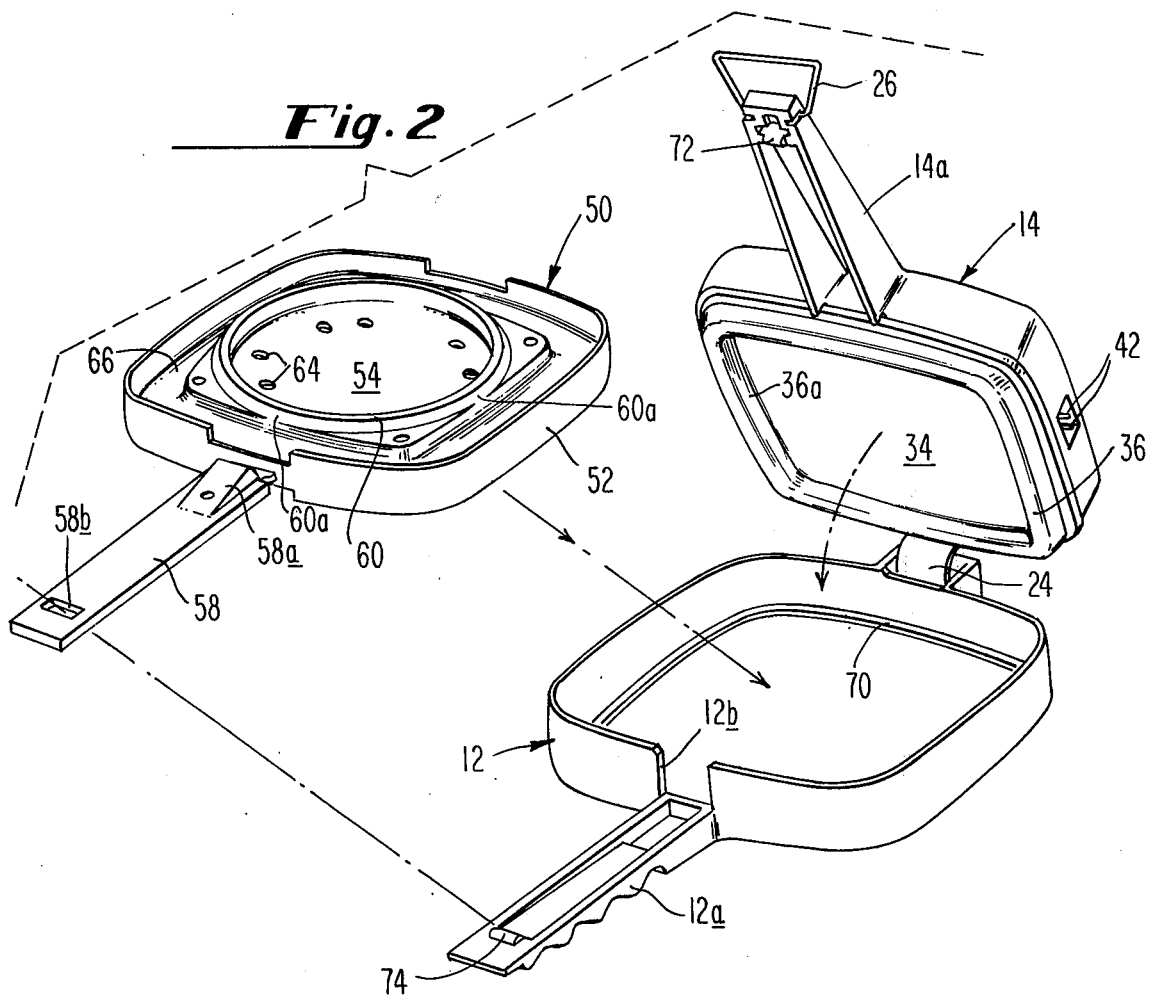

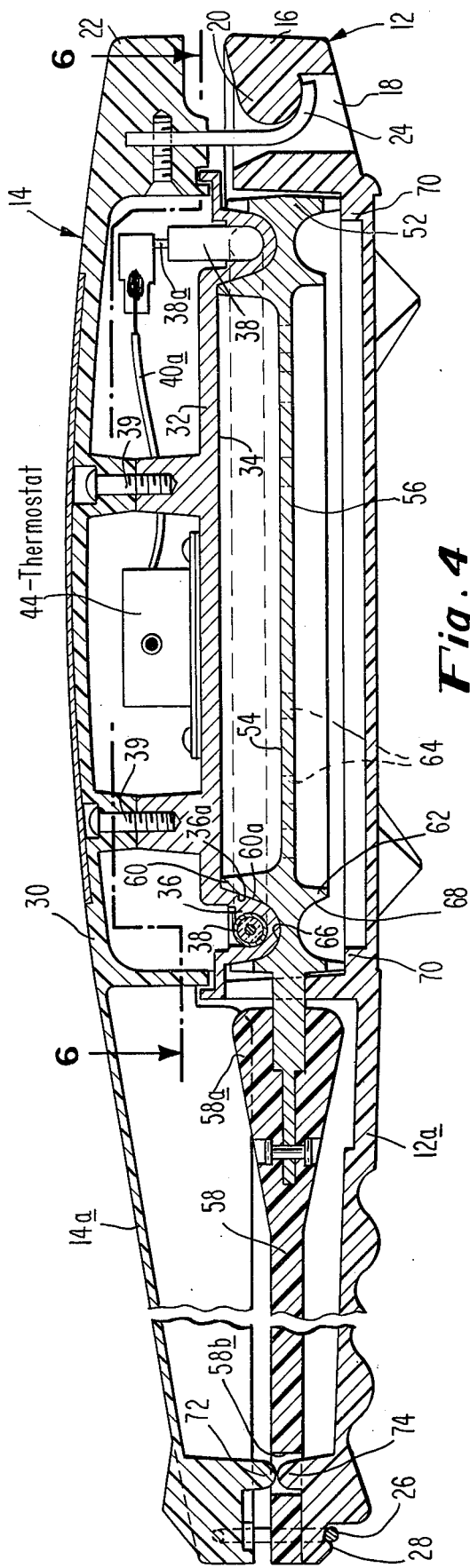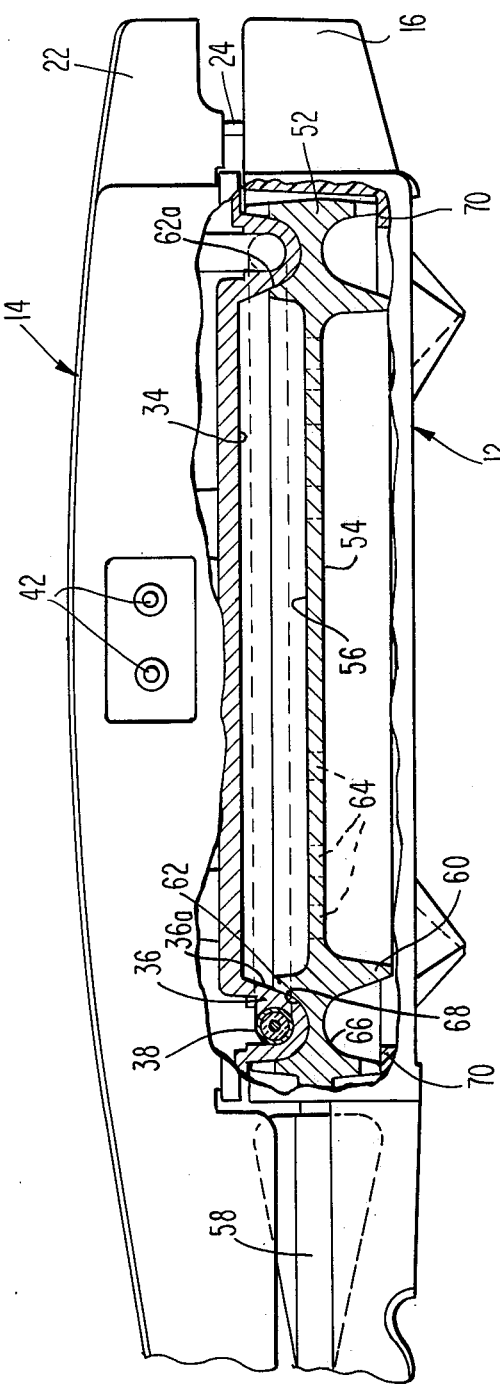

ELECTRIC COOKING APPLIANCE WITH REVERSIBLE GRILL

CROSS REFERENCES TO RELATED APPLICATIONS

This utility patent application is related to an earlier-filed design application, Ser. No. 613,616, filed by the Applicant Sept. 15, 1975 now U.S. Pat. No. 240,993 issued Aug. 17, 1976. While the earlier-filed design application is directed to the same device, it does not disclose the invention claimed in the present application.

BACKGROUND OF THE INVENTION

1. Field of the Invention

This invention relates to electrical fast cookers and devices embodying the invention are adapted to cook quickly hamburgers, sandwiches, and the like.

2. Description of the Prior Art

The prior art includes cooking devices which comprise a base pan having clampingly associated therewith an electrically-heated cover, and a grill adapted to be interposed between the pan and cover, the grill having a cooking surface adapted to receive a hamburger patty and to cooperate with an upper heating surface in the cover in cooking it. An example of such a structure is shown in the U.S. Pat. No. De 231,069, issued April 2, 1974.

One of the drawbacks of earlier structures is that they are limited, when operated in its normal fashion, to food articles having a single configuration, for instance, the round shape of a hamburger.

There has been a need for a cooker of similar arrangement to that described above but more wide-ranging in its usefulness to include the cooking of foods of, for instance, square or rectangular shape such as grilled sandwiches. Heretofore, it has been considered a problem to maintain the benefits of the earlier structure, such as its good heat transfer, compact shape, and speed of cooking, and of the aforesaid desired flexibility.

SUMMARY OF THE INVENTION

Under the present invention, a fast cooker is provided which fills the need for adaptability to varied shapes of cooked objects. This is achieved by providing a grill having cooking surfaces of various configurations on its two opposite sides so that the grill may be inverted depending on the shape of food article to be cooked. Good heat transfer between the heated cover and the grill is achieved irrespective of which grill cooking surface is directed upwardly, by providing both surfaces with mating zones preferably grooves, adapted to receive in heat exchange relation a heated rib depending from the downwardly-directed cooking face of the unit cover.

BRIEF DESCRIPTION OF THE DRAWING

Other features of the invention will be apparent from the following description which refers to the accompanying drawings, all of which disclose a non-limiting embodiment of the invention. In the drawings:

FIG. 1 is a perspective view of a cooker embodying the invention shown in the closed disposition;

FIG. 2 is an exploded view in perspective showing the cooker in hinged open disposition with the grill shown to one side;

FIG. 4 is an enlarged sectional view taken on the line 4—4 of FIG. 1;

FIG. 5 is a fragmentary sectional view, partly in profile, showing the grill with opposite cooking surface up as compared to FIG. 4.

DESCRIPTION OF THE PREFERRED EMBODIMENTS

Figure 6:
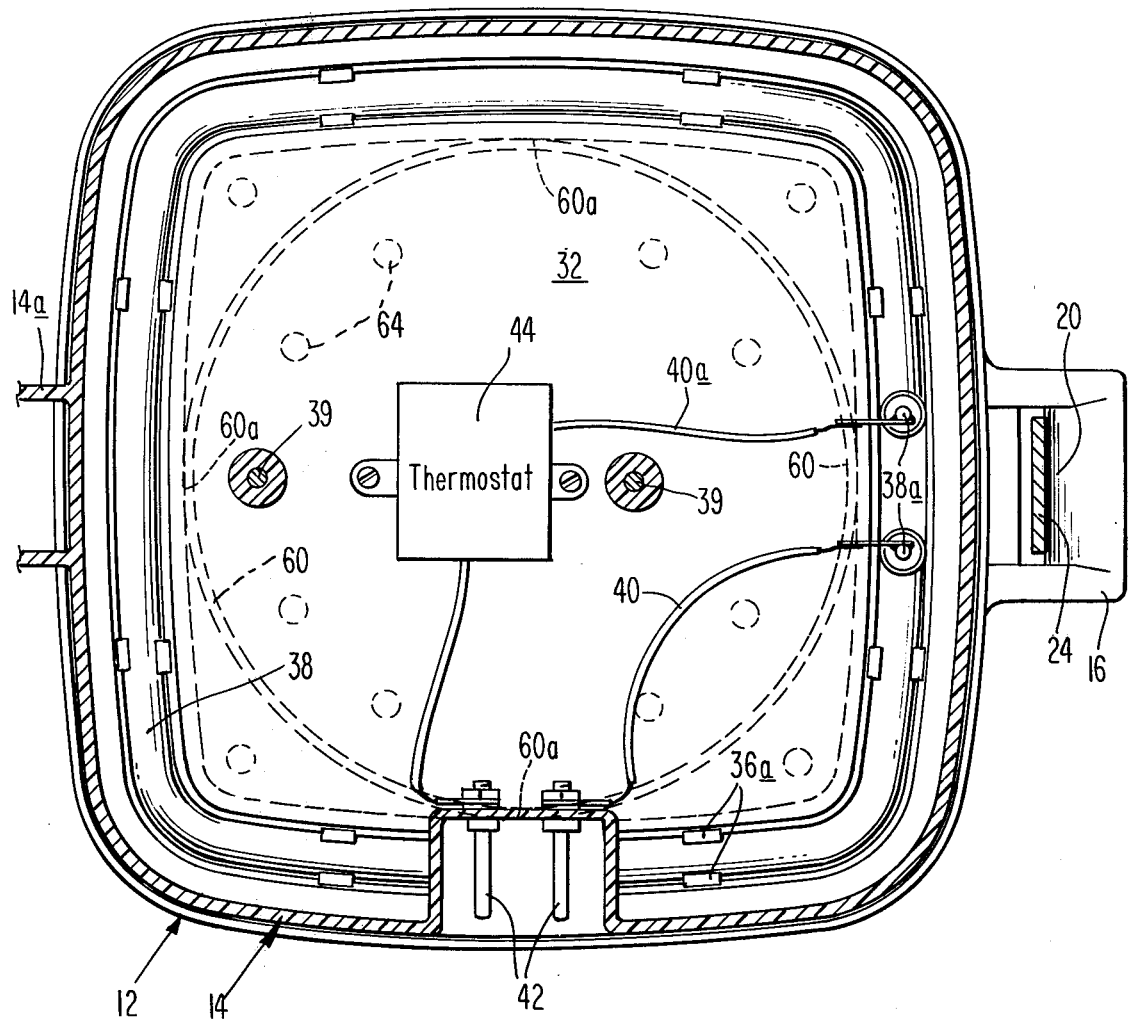
FIG. 6 is a sectional view taken on the line 6—6 of FIG. 4.

Referring more specifically to the drawings, the fast cooker embodying the invention is generally designated 10 in FIG. 1. It comprises a base pan 12 and a heated cover for the pan 14. Both pan and cover are shown with aligned, laterally extending handles 12a and 14a, respectively. The pan is formed with a notch 12b above the juncture of the handle 12a and receptacle portion of the base pan.

As shown in FIG. 4, base pan 12 is formed with a forward projection 16 opposite the handle 12a. The projection is provided with an opening 18 presenting an inwardly-directed knuckle 20. Aligned with the projection 16 and formed on the cover 14 is the projection 22 which has mounted therein a depending finger 24 adapted to engage the knuckle 20, as shown, to removably but hingedly connect the cover and base pan. Thus, when unlocked, the cover may be hinged open so that the finger 24 may be completely removed from the base pan so that the base pan can be immersed in a washing solution.

At the distal end of the handle 14a, there is provided a hinged bail lock 26 which may be snapped over a nib 28 at the distal end of the handle 12a to lock releasably the cover and base pan in the closed position.

As best shown in FIG. 4, the cover 14 comprises a top wall 30 of plastic to the underside of which is secured a metal frame 32. The undersurface of the metal frame 32 provides a flat cooking surface 34 which is surrounded by a depending rib 36. Disposed in a depression in the opposite side of the rib 36 is a Calrod, an ensheathed heating element 38, which provides heat for the frame 32. As shown, bolts 39 or the like secure the frame to the plastic top wall 30.

As shown in FIG. 6, the terminals 38a of the Calrod extend upwardly and are connected to respective leads 40 and 40a which extend to the contact pins 42 accessible from without the cover and adapted to be engaged by the usual electric connecting cord. Lead 40a is interrupted by a conventional thermostat 44 secured in heat exchange relation to the frame 32 and adapted to open the electric circuit of the cooker at excessive temperatures.

The Calrod is held in the depression formed in the rib 36 by being staked therein as at 36a.

The lower cooking surface comprises an invertible metal grill generally designated 50. The grill is integrally formed with a rim 52 extending upwardly and downwardly therefrom, and a cooking surface 54 for one type of food article is provided on one face of the grill while a second cooking surface 56 is provided on the oppositely-facing surface. For convenience, handle 58 is provided extending laterally from the grill, and is formed on both upper and lower surfaces with thumb guards 58a to protect the operator from the heat of the grill, the handle and guard being of insulating plastic. The handle 58 is formed with an aperture 58b adjacent its distal end.

As shown, the one cooking surface 54 is surrounded and defined by a circular dam 60 so that it is adapted to cook circular hamburger patties or the like. The opposite cooking surface 56 is surrounded and defined by a square or rectangular dam 62 and suitable for cooking grilled sandwiches. It is to be noted that the grill is perforated as at 64 within the dams to permit cooking juices to drip into the base pan 12. It is also (FIG. 2) to be noted that when the circular wall side is up, holes extend through the grill upward of the circular wall to drain juices which may spill over the top of that wall in the hamburger cooking process (see also FIG. 6).

An essential feature of the invention is that the respective cooking surfaces are surrounded outwardly of the respective dams by mating zones to receive the rib; preferably the zones are peripheral grooves 66 and 68 respectively, the grooves being identical in configuration adapted to cooperate with the rib 36 selectively in heat exchange relationship so that the heat from the Calrod 38 is communicated through the rib 36 to the metal surface of the groove 66 or 68 associated with the cooking surface facing upward. This is true irrespective of whether it is the one surface 54 or the other surface 56 which is in cooking position.

Figure 3:
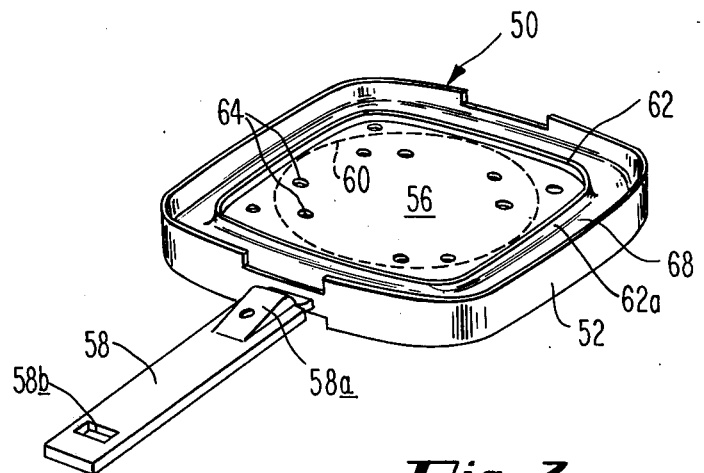
FIG. 3 is a perspective view showing the opposite face upward of the grill shown in FIG. 2 the circular wall on the other side of the grill being shown in phantom.

It is to be noted from the drawings (FIGS. 3 and 5) that the outer surface 62a of the rectangular wall 62 is a smooth upward extension of the mating zone or groove 68 closely conforming to the shape of the inwardly facing upward portion 36a of the rectangular rib 36. Also (FIGS. 2, 4, and 6) a plurality of spaced portions 60a of the outer surface of the circular wall 60 comprise smooth upward extensions of the mating zone or groove 66 closely conforming to the shape of the inwardly facing upper portion 36a of the rectangular rib 36 (FIG. 4). This shaping of the parts increases the area of the metal grill which is in engagement with, or closely proximate to, the heated rib. Such arrangement enhances the heat transfer from the heated rib 36 to the grill 50.

It is to be noted that the interior of the sidewall of the base pan 12 is formed with a ledge 70 to serve as a grill support means and that both the cover handle 14a and the base pan handle 12a are formed with contacting nibs respectively, 72 and 74. Because the outer portion of the periphery of the grill in the area of the mating zones is substantially symmetrical, ledge 70 serves to hold the grill upward so that the upwardly facing mating zone 66 or 68 engages the rib 36 irrespective of which side of the grill is up. Additionally, the ledge 70 as shown (FIGS. 4 and 5) serves to hold the grill above the floor of the base pan 12 so that the floor does not heat excessively the surface which supports the unit.

In assembly, as for operation, the cooking surface 54 or 56 is selected depending on the food to be cooked and the food, hamburger or sandwich, is placed on the appropriately shaped surface which surface is directed upwardly. The grill is then placed in the base pan 12 with the downward edge of the rim 52 resting on the ledge 70 and the handle 58 extending through the notch 12b of the base. The opening 58b of the handle is placed to receive the nib 74. The cover 14, already pre-heated, is hingedly associated with the knuckle 20 as described and brought closed so that the cooking surface 34 engages the top surface of the food. The handle 14a is brought down over the handle 58 and 12a so that the food stuff is compressed and firmly clamped between the cooking surface. The nibs 72 and 74 engage through the opening 58b. The bail 26 is then brought around and snapped over the nib 28 to lock the unit together. After a prescribed cooking time, the assembly process is reversed, the cover opened to expose the cooked food for appropriate disposition.

With the structure as disclosed, it is possible to hold clampingly either a sandwich for grilling, or a hamburger for cooking, by selecting the properly-shaped surface 54, 56 and having that surface directed upwardly to support the item. Provision of grooves 66 and 68 on either side of the grill engages rib 36 over a wide surface area promotes adequate heat transfer from the Calrod. At the same time, the unit maintains the compactness, convenience, and fast cooking characteristic of prior units.

Having thus described the invention, what is desired by way of patent protection is defined by the scope of the following claim language which, of course, includes equivalents.

I claim:
1. A versatile efficient electric fast cooker for hamburgers, sandwiches and the like comprising
   a. a rectangular cover having on the bottom thereof a flat downwardly-facing cooking surface surrounded by a substantially rectangular downwardly porjecting heat-conducting continuous rib containing an electric heating element;
   b. a drip-receiving box-like rectangular base pan having an open top, sidewalls, and a floor, said base pan adapted to mate with and support the cover;
   c. hinge means connecting the cover and base pan;
   d. a perforated, substantially flat two-sided invertible rectangular metal grill adapted to be received by the base pan, one of the sides constituting the hamburger-cooking side of the grill and presenting an inwardly facing, relatively circular wall surrounding a portion thereof, and the other side constituting the sandwich-grilling side of the grill and presenting an inwardly facing substantially rectangular wall surrounding a portion thereof, the grill having a continuous rectangular mating zone adjacent the periphery of each side and outward of said square and round walls respectively and adapted to align with and engage the rectangular downwardly projecting rib on the cover when the cooker is assembled, the outer surface of the rectangular wall being a smooth upward extension of the mating zone conforming closely to the shape of the inwardly facing upward portion of the rectangular rib, and a plurality of spaced portions of the outer surface of the circular wall also being smooth upward extensions the mating zone conforming closely to the shape of the inwardly facing upward portion of the rectangular rib; and
   e. support means in the base pan for engaging at least a portion of the underside of the grill to support the grill in the base pan, the support means and the grill being so shaped that irrespective of which surface is upward, the support means holds the grill up with the upward mating zone engaging the rib;
   whereby when the cooker is assembled with the sandwich grilling side upward, the grill is adapted to support for cooking a square sandwich or the like, and when the cooker is assembled with the hamburger-cooking side upward, the grill is adapted to support for cooking a round hamburger or the like, in the respective instances the upwardly facing mating zone as well as the outer surface of the rectangular wall and at least some of said portions of the circular wall being in engagement with or very proximate the rib to provide effective heat exchange from the heating-element-containing rib to the grill.

2. A fast cooker as claimed in claim 1 wherein the mating zone on each side comprises a groove into which the rib nests.

3. A fast cooker as claimed in claim 1 wherein the cover, the grill, and the base pan are formed respectively with aligned side-by-side laterally extending handles opposite the hinge means, the handles adapted to be gripped together when the cooker is fully assembled.

4. A fast cooker as claimed in claim 3 wherein the distal end of the grill handle is formed with an aperture therethrough and at least one of the other handles has a projecting lug aligned with the aperture and adapted to be received thereby to keep said handles in alignment in assembly.

5. A fast cooker as claimed in claim 1 wherein perforations are formed in the grill outside the circular wall as well as inside the circular wall.

6. A fast cooker as claimed in claim 1 wherein the relatively circular wall on the hamburger cooking side when upward in the assembled unit extends upward to contact the underside of the downwardly facing cooking surface of the cover to tend to seal cooking juices within the cooking surface areas, and wherein the rectangular wall on the sandwich grilling side, when upward in the assembled unit, stops well short of the downwardly facing cooking surface.

7. A fast cooker as described in claim 1 wherein the support means in the base pan comprises ledge means projecting inward from at least some of the side walls of the base pan to engage the underside of the periphery of the grill to support the grill horizontally above the floor of the base pan, and the vertical cross section of the periphery of the grill transverse of the mating zone on opposite sides is symmetrical.

* * * * *

UNITED STATES PATENT OFFICE
CERTIFICATE OF CORRECTION

Patent No. 4,011,431      Dated March 8, 1977

Inventor(s) Monte L. Levin

It is certified that error appears in the above-identified patent and that said Letters Patent are hereby corrected as shown below:

Cancel "19" in inventor's address, insert --16--.
Add as assignee: Scovill Manufacturing Company, Waterbury, Connecticut
Add as attorney: Dallett Hoopes

| | | |
|---|---|---|
| Col. 1, line | 9: | after "U.S.", insert --Design--. |
| | 28: | cancel "De", insert --Des.--. |
| | 31: | cancel "its", insert --their--. |
| | 54: | after "zones", insert comma --,--. |
| Col. 2, line | 2: | after "Fig. 2", insert comma --,--. |
| | 14: | cancel "Embodiments", insert --Embodiment--. |
| Col. 3, line | 1: | cancel "guard", insert --guards--. |
| | 5: | cancel "dam", insert --wall--. |
| | 8: | cancel "dam", insert --wall--. |
| | 10: | cancel "dams", insert --walls--. |
| | 18: | cancel "dams", insert --walls--. |
| | 44: | cancel "a" after "as". |
| Col. 4, line | 13: | cancel "engages", insert --which selectively engages--. |
| | 28: | cancel "porjecting", insert --projecting--. |
| | 44: | cancel "square", insert --rectangular--. |
| | 45: | cancel "round", insert --circular--. |
| | 54: | after "extensions", insert --of--. |

Signed and Sealed this

Eighth Day of November 1977

[SEAL]

Attest:

RUTH C. MASON      LUTRELLE F. PARKER
Attesting Officer      Acting Commissioner of Patents and Trademarks